(12) United States Patent
Bhanushali et al.

(10) Patent No.: US 11,604,703 B2
(45) Date of Patent: Mar. 14, 2023

(54) SYSTEMS AND METHODS FOR PERFORMING BACKUPS OF A SERVER DATABASE

(71) Applicant: EMC IP Holding Company LLC, Hopkinton, MA (US)

(72) Inventors: Jigar Premajibhai Bhanushali, Bangalore (IN); Sunil Yadav, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/648,694

(22) Filed: Jan. 24, 2022

(65) Prior Publication Data

US 2022/0147421 A1    May 12, 2022

Related U.S. Application Data

(62) Division of application No. 16/170,484, filed on Oct. 25, 2018, now Pat. No. 11,263,085.

(51) Int. Cl.
*G06F 16/00*    (2019.01)
*G06F 11/14*    (2006.01)
*G06F 16/23*    (2019.01)
*G06F 16/2455*    (2019.01)
*G06F 16/11*    (2019.01)

(52) U.S. Cl.
CPC ........ *G06F 11/1451* (2013.01); *G06F 16/122* (2019.01); *G06F 16/2365* (2019.01); *G06F 16/24564* (2019.01); *G06F 2201/84* (2013.01)

(58) Field of Classification Search
CPC .................................................. G06F 16/122
See application file for complete search history.

(56) References Cited

U.S. PATENT DOCUMENTS

2008/0059732 A1    3/2008   Okada et al.
2016/0364156 A1    12/2016  Haustein et al.

*Primary Examiner* — Ajith Jacob
(74) *Attorney, Agent, or Firm* — Workman Nydegger

(57) ABSTRACT

Systems and methods for performing differential and full data protection operations. Parameters that define minimum, interval, and maximum values are provided to an agent. These values relate to changes in the data or in a database. The agent monitors the database and backups are triggered in accordance with these values. A differential backup is not performed until the minimum value is reached and differential backups are performed only after subsequent intervals are reached. A full backup is performed once the maximum value is reached.

20 Claims, 5 Drawing Sheets

SYSTEMS AND METHODS FOR PERFORMING BACKUPS OF A SERVER DATABASE

FIELD OF THE INVENTION

Embodiments of the present invention relate to systems and methods for performing backup operations. More particularly, embodiments of the invention relate to systems and methods for performing smart differential and/or full backups of a server database.

BACKGROUND

In one example, a differential backup is type of backup that includes data that has changed since the most recent backup or since the most recent full backup. A restore operation can then be performed using the full backup and a differential backup. Often, database administrators (DBAs) protect their databases (e.g., SQL server database) by scheduling backup operations. Typically, these backups are scheduled to recur on a specific hour interval. For example, a differential backup may be scheduled to occur every 24 hours and a full backup may be scheduled to occur every 7 days.

This type of manual scheduling can lead to various problems. For example, a differential backup may be performed or triggered even though there have been no actual changes in the database or when the number of changes has been small. This creates a long chain of backups. A long chain of backups is associated with increased maintenance during a restore operation and consumes computing storage resources unnecessarily.

In addition, performing a differential backup on a database that has a large number of changes has time and cost requirements that are similar to those of performing a full backup. Consequently, there is no real benefit in performing the differential backup in this case. In fact, performing the differential backup in this case can actually have the adverse effect of increasing the time needed to perform a restore operation.

This invention describes the solutions which will perform smart or intelligent differential or full backup in SQL 2017 to resolve above issues.

Avamar provides the support for differential backup. Differential backup will protect the changes since the last full backup. So during restore we can use the full backup and the last differential backup to recover the databases.

In the production environment customer usually schedule transaction log backup for every 24 hour span. In case sometimes there is not much changes in the data for the databases. So we create unnecessary backup chain which would be hard for DBA to maintain. This will also increase restore time for the database.

Sometimes with large number of changes in the database, cost and time to complete differential backup is similar to that of full database backup so there is no real benefit of taking differential backup in this case but it can rather increase the restore time of database.

More generally, conventional approaches to protecting a database may include a scheduled differential backup. These types of approaches, however, often consume more resources (e.g., unnecessary backups and associated processing time) than necessary and often adversely impact the time required to perform a restore operation. From the perspective of the DBA, it is difficult to manually monitor the database at least because a customer typically has many databases. Continuously monitoring the databases is not practical or effective.

Systems and methods are needed to perform differential and/or full backups in a smart and intelligent manner.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for performing data protection operations. Data protection operations may include, but are not limited to, backup operations including full backup operations and incremental backup operations, restore operations, de-duplication operations, or the like.

Embodiments of the invention further relate to systems and methods for performing data protection operations in the context of a database such as a SQL database. In one example, embodiments of the invention query the database (e.g., perform a SQL query). The result of the query can be used to trigger a differential backup or a full backup. The decision on when to perform a backup and/or the type of backup to be performed is based, at least in part, on the results of the query.

Figure 1:
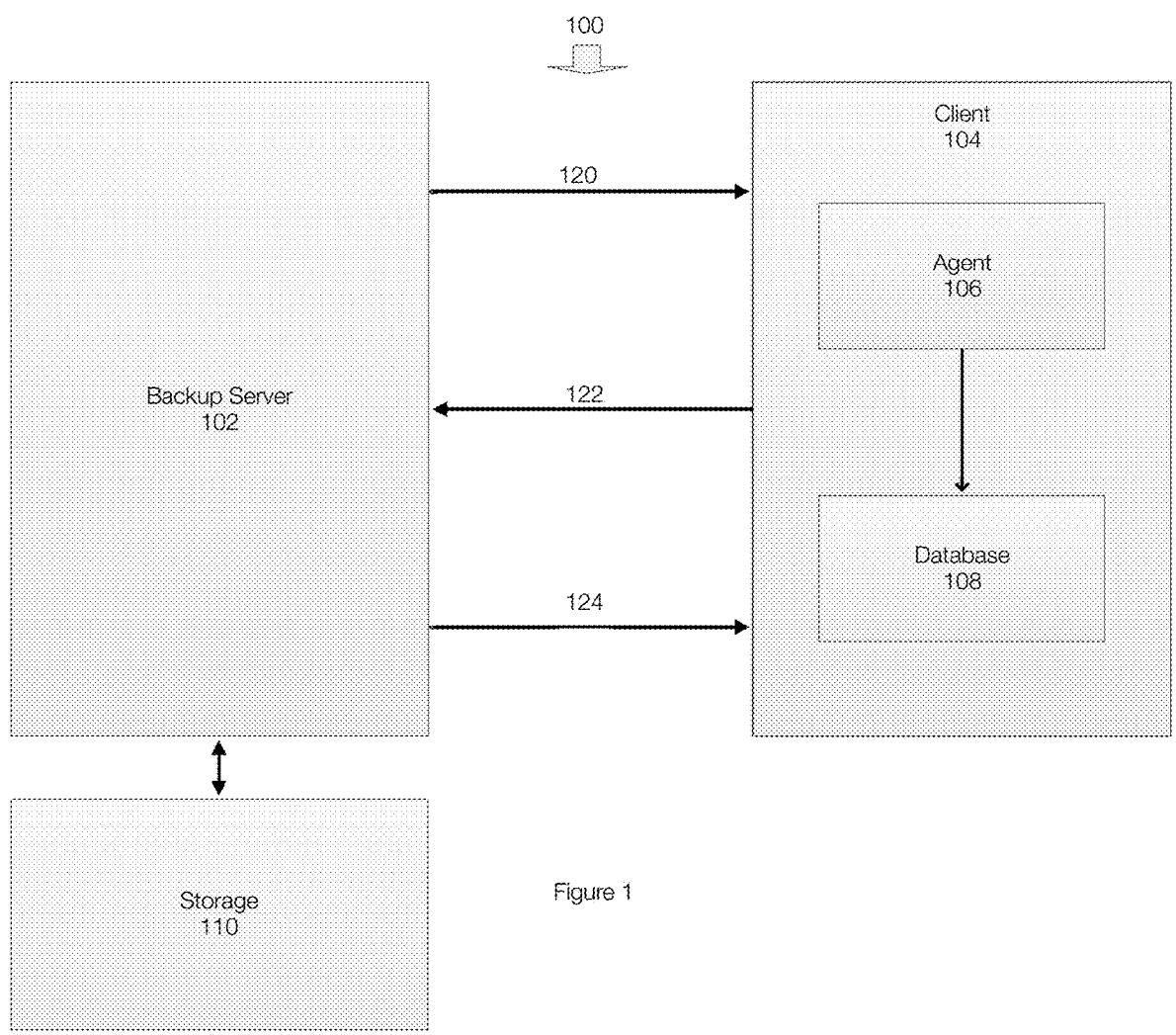
FIG. 1 illustrates an example of an computing environment and illustrates a data protection system.

FIG. 1 illustrates an example computing environment 100 in which data protection operations including backup operations may be performed. FIG. 1 illustrates a backup server 102 that is configured to perform data protection operations. The server 102 is configured to backup a client 104. More specifically, the server 102 is configured to backup data such as a database 108 that is associated with the client 104.

The server 102 is associated with storage 110. The storage 110 may store backups of data/applications such as a database 108. The backups of the database 108 may include a series of backups. For example, a series may include a full backup and one or more differential backups. A series may include one or more full backups and one or more differential backups. By maintaining these types of backups, the database 108 can be restored to various points of time if necessary.

The backup server 102 may be associated with an agent 106. The agent 106 is typically installed on and may operate on the client 104. The agent 106 is configured to communicate with both the server 102 and the database 108.

Generally, embodiments of the invention perform backup operations of the database 108 in a smart manner that overcomes problems of backups that are simply scheduled. As illustrated in FIG. 1, the server 102 may communicate 120 various values to the agent 106. These values may include a transaction size, number of virtual log files, threshold values, or the like. For example, the values may reflect a minimum change value, a maximum change value and an internal value for a modified page count rate. These values may be specified by a customer or DBA and may be expressed in terms of percentage.

The agent 106 can then query the database 108 using, in one example, a query that is native to the database 108 itself. The query may check the extent page count for the database 108. Based on the result and the values received from the server 102, the agent may notify 122 the server 102 to trigger a backup operation. The server 102 may then send a workorder 124 to the agent 106 to perform a backup. The workorder may specify the type of backup to be performed.

In this example, a query that is specific to the database (e.g., an SQL query for an SQL database) can be used in a backup script to trigger a differential backup or a full backup based on the extent page count or based on how much the database 108 has changed. This advantageously schedules backup operations in a smart memory and ensures that computing resources (e.g., storage and processing) are being used more effectively and ensures that restore operations can be completed more easily.

In this example, the agent 106 may run continuously on the client 104. The agent 106 is capable of monitoring all databases in a production environment. Other clients may also be associated with the agent 106 or may have their own agents 106. In addition, the backup operations can be performed without manual intervention from the DBA. Even if the DBA initially sets the criteria for the backup operation, the agent 106 evaluates the criteria and decides when to trigger a backup operation.

As previously stated, embodiments of the invention may perform backup operations for multiple databases. The server 102 can set r range for a number of the modified extent page count for each database and an interval number for each of the databases. Thus, the numbers or values of one database may differ from the number associated with another database. In one example, a user ma set these values in terms of percentage. In addition, the server 102 can determine an interval (e.g., every 15 minutes or other interval) at which the numbers are evaluated (e.g., an interval at which the agent 106 queries the database 108).

The server 102 sends minimum, maximum and interval values for modified extent page count to the agent 106 which continuously runs on the client 104. The agent 106 stores these values for each database and monitors all of the databases to check for the number of changed pages.

In one example, the DBA or server can set the value of the modified extend page count (modified page count) and interval number or value in percentage (%). The agent 106 (or the server 102) may determine the necessary values or numbers from the percentage.

In operation, if the modified page count is determined to me more than the minimum value or percentage by the agent 106, a differential backup may be triggered. Subsequent backups may be triggered in accordance with the interval number. For example, if the minimum value is 20% and the interval value is 10% and the maximum value is 75%, a differential backup will be triggered when the modified page count exceeds 20%. Then, differential backups will be triggered each time the interval number is exceeded. Thus, differential backups will be performed when the modified page count exceeds 30%, when the modified page count exceeds 40%, when the modified page count exceeds 50%, when the modified page count exceeds 60% and when the modified page count exceeds 70%. When the modified page count exceeds 75%, a full backup is triggered and the page count is reset. The foregoing process is then repeated.

This allows the server 102 (or the customer) to effectively schedule interviews based on changes in the database and not based on time. This process conserves resources. For example, backups that contain few to no changes are not performed. This process ensures that full backups are performed when the number of changes are large. This makes the restore process easier and by ensuring that the restore operation does not have to handle a differential backup with a large number of changes.

Figure 2:
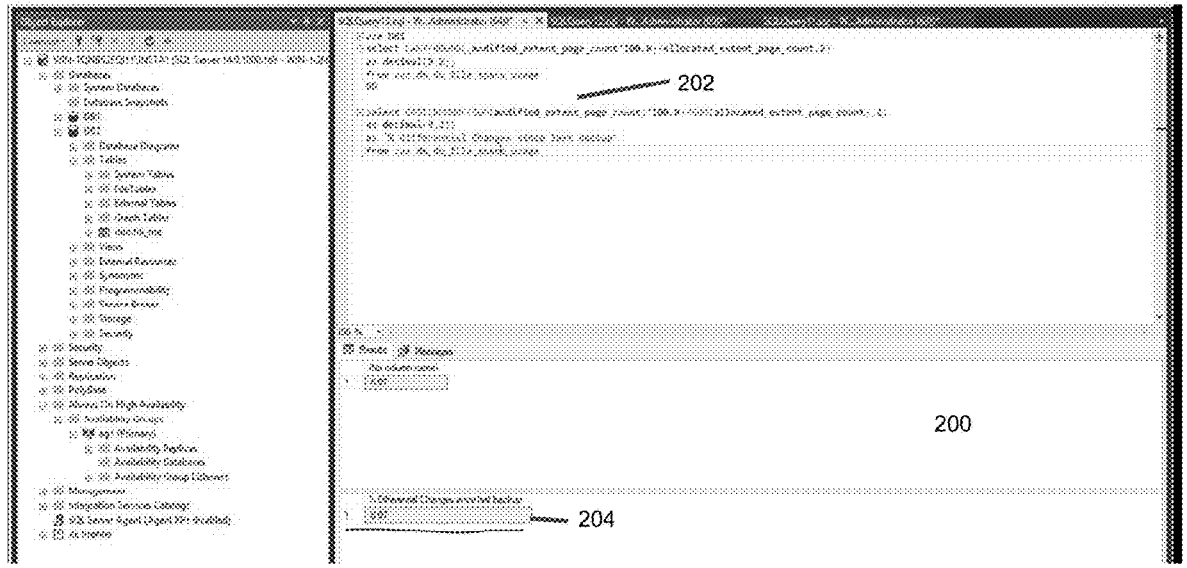
FIG. 2 illustrates a user interface that includes a response to a query at a first time.
Figure 3:
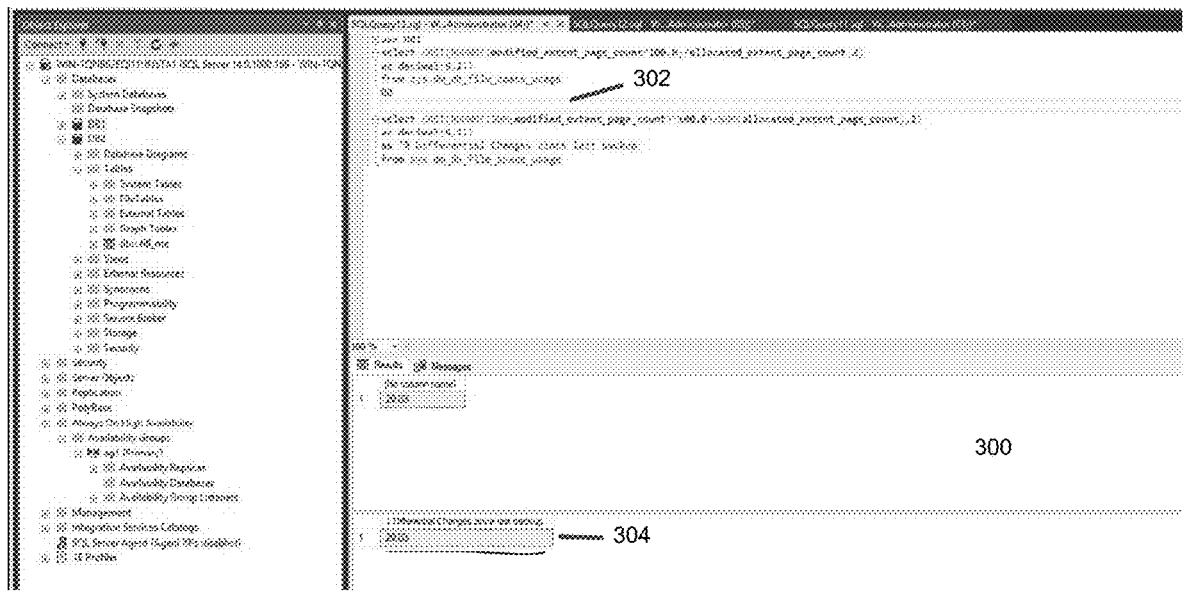
FIG. 3 illustrates a user interface that includes a response to a query at a second time.
Figure 4:
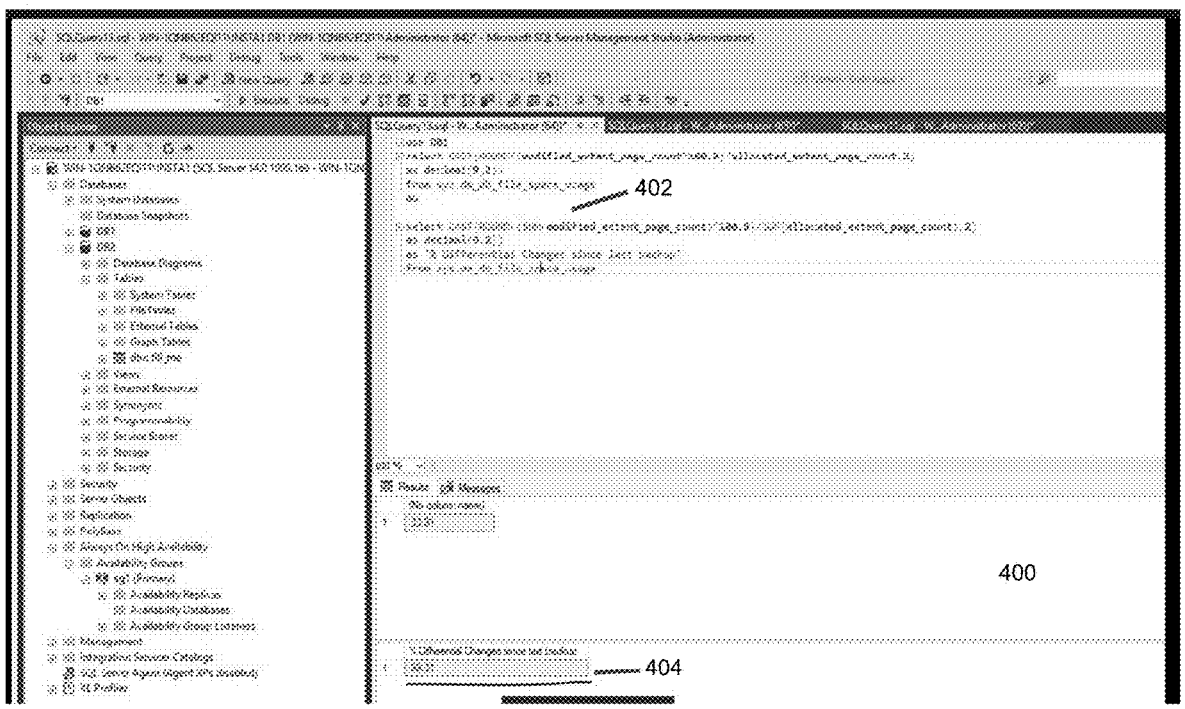
FIG. 4 illustrates a user interface that includes a response to a query at a third time.
Figure 5:
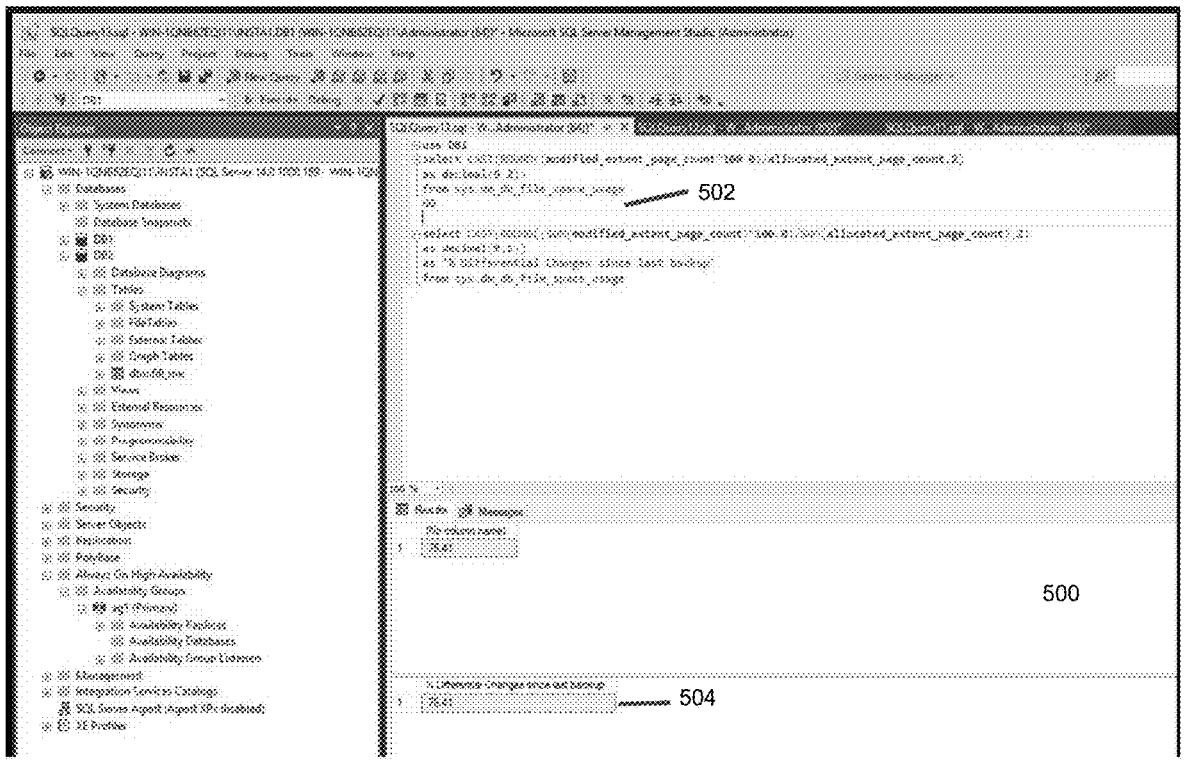
FIG. 5 illustrates a user interface that includes a response to a query at a fourth time.
Figure 6:
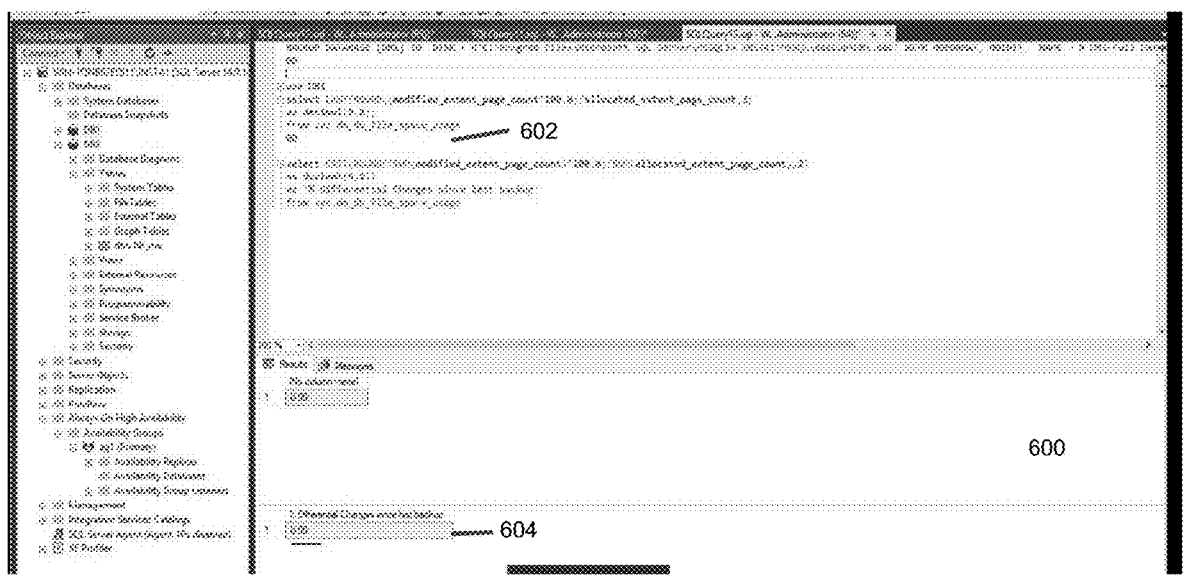
FIG. 6 illustrates a user interface that includes a response to a query at a fifth time.

FIGS. 2-6 each illustrate a user interface 200 (at different times) associated with native database query to obtain the modified page count. FIG. 2 also begins with the assumption that the database is new. FIG. 2 illustrates a user interface 200 that shows a query 202 and a modified page count 204. Similarly, FIG. 3 illustrates a query 302, FIG. 4 illustrates a query 402, FIG. 5 illustrates a query 502 and FIG. 6 illustrates a query 602.

The modified page count 204 contains a value (7%) that is less than the minimum value for the modified page count. Thus, since starting the database as new, the modified page count is equivalent to 7%. As a result, no backup is triggered. The query 302 results in a modified page count 304 whose value is greater than 20%. Because 20% is greater than the minimum value, a differential backup is triggered.

The query 402 results in a modified page count of 33.31 percent. This results in an interval percentage of about 13% (modified page count 404—modified page count 302). Because this interval value is greater than the interval value of 10%, a differential backup is triggered. A differential backup may be triggered each time the interval exceeds 10% (or other specified interval value). In one example, this is determined from the difference between the current modified page count and the modified page count that triggered the last differential backup.

The query 502 results in a modified page count 504 that is greater than the maximum value. As a result, a full backup is triggered. The query 602 shows a modified page count of 0. Thus, performing a full backup effectively resets the modified page count.

FIGS. 2-6 demonstrate that if the modified page count is between the minimum size and the maximum size, the agent 106 sends a signal to the server 102 to trigger a differential backup. After the first differential backup is performed, the next differential backup will be performed after the interval value received from the server 102 is reached or exceeded. For example if the range is 25% (minimum value received from server) to 75% (maximum value received from server) and interval is 10% (interval value received from server), then first differential backup will be performed when the number of changed pages are 25% or when the modified page count, as determined from the query, is 25% or greater. Subsequent backup will be performed at 35%, 45% etc., which is based on the interval value. When the modified page count or when the number of changed page are more than the maximum value received from the server 102, the differential backup will be promoted to full backup. In this example, the differential backup will be promoted to full when number of changed pages or the modified page count are more than 75%.

By giving a minimum value or minimum number of pages (or minimum number of changes), embodiments of the invention ensure that no differential backup will be performed until the minimum value is reached. As a result, if there is no change in the database, a differential backup will not be performed. This conserves storage space and the processing time that would otherwise be consumed performing an unnecessary backup.

After the minimum value is reached, the differential backup is triggered and subsequent differential backups are triggered at the specified interval. A full backup is performed once the maximum value is reached. Advantageously, the full and differential backups can be completely automated without any manual intervention. The DBA does not need to run manual queries and does not need to continuously monitor all of the databases in the computing system.

Figure 7:
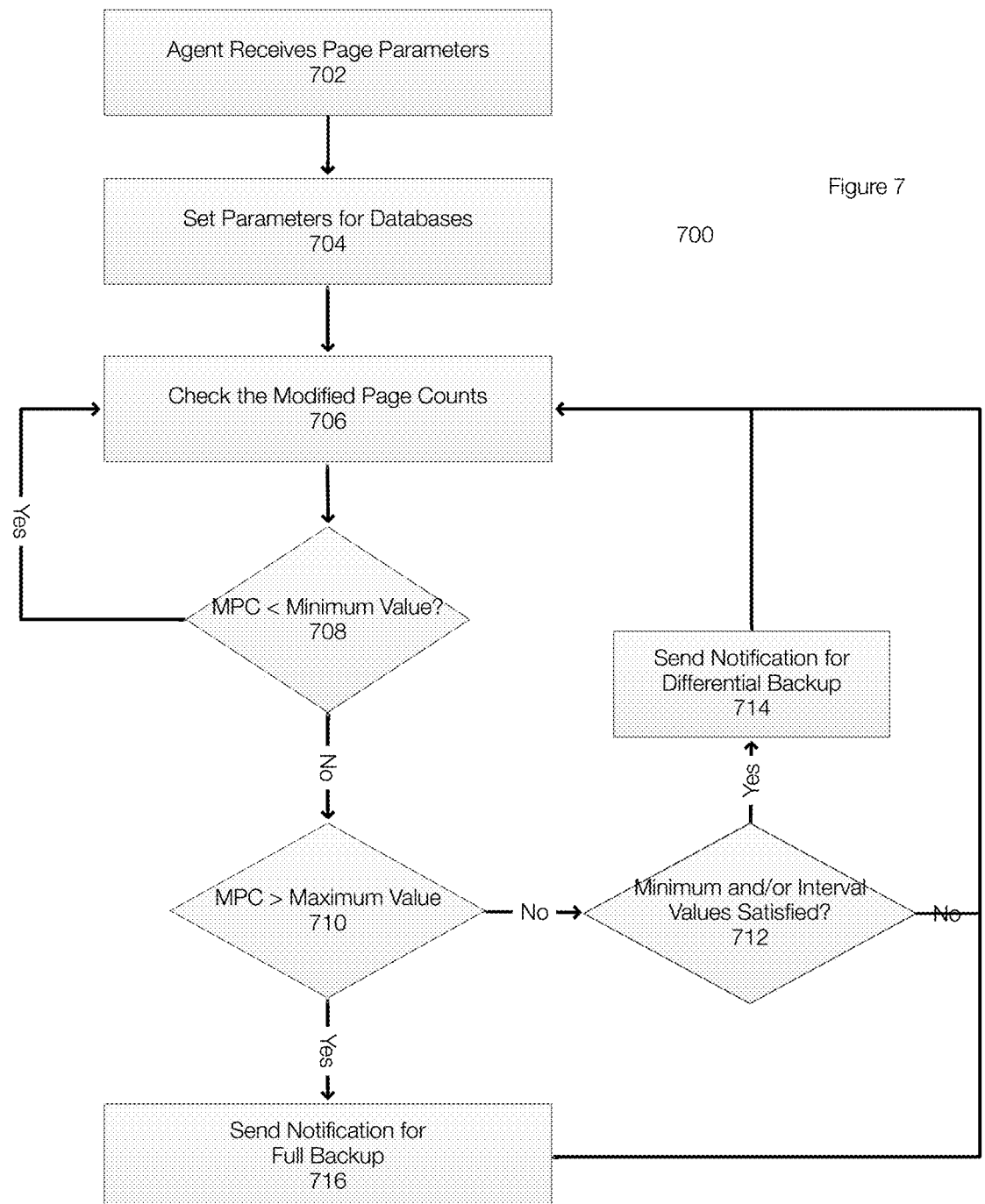
FIG. 7 illustrates an example of a flow diagram for performing a data protection operation, for a database, that includes automatically performing differential backup operations and full backup operations.

FIG. 7 illustrates an example of a flow diagram for performing backup operations for a database. The method 700 may begin when an agent operating on a client device or machine, receives 702 parameters. The parameters may include a minimum value, an interval value, and a maximum value. These values may refer to changes in the data being protected and may be expressed as percentages. The agent may convert the percentage to another value. For example, the minimum value may be 20%. Thus, when 20% of the pages have changed or when 20% of the pages have changed, a backup operation may be triggered.

These parameters are then set 704 for the database. These parameters may be set for all databases or for some of the databases in a computing system. Once the parameters have been set, the modified page counts (MPCs) of the databases are monitored or checked 706. The modified page counts (or other values indicative of changed data) may be monitored periodically (e.g., every 10 minutes, every 15 minutes), continuously, or the like.

If the MPC is less than a minimum value 708, the method returns to checking the page counts. When the MPC is greater than the minimum value, the method checks to see if the MPC is greater than a maximum value 710. If the MPC is greater than the maximum value, a notification to perform a full backup 716 is sent to the server and a full backup is performed. The modified page count may be reset at this time.

If the MPC is less than the maximum value, a check is made to compare the MPC with the minimum value and with the interval value. If the MPC is greater than or equal to the minimum value and, in the context of the current MPC, a backup has not been performed, a notification for a differential backup 714 is sent to the server. This then results in the first differential backup since the most recent full backup.

If the MPC is greater than the minimum value and the interval value is satisfied, a notification to perform a differential backup is sent 714 to the server. For example, if the minimum value is 20% and the interval value is 10%, the notification to perform a differential backup is sent the first time that the MPC is greater than the minimum value. The next differential backup is not triggered until the MPC is greater than the minimum value plus the interval value.

Stated differently, when the minimum value is 20%, the interval value is 10%, and the maximum value is 75%, differential backups are triggered when the MPC is greater than 20%, 30%, 40%, 50%, 60%, and 70%. If a differential backup is performed at 32% and the next MPC is 38%, a differential backup is not triggered. Rather, the next differential backup is not triggered in this example until the MPC is greater than 40%.

In sum, if "modified page count"<minimum modified page count then no backup will be performed for this database.

If for any of the databases, the modified page count crosses the minimum value then the agent will send a notification to the server to trigger a differential backup.

After the initial differential backup, the agent will check whether the "modified page count">"last differential backup page count+interval" and "modified page count"<maximum modified page count and the agent will a send notification to the server to trigger a differential backup.

If "modified page count"> maximum modified page count, then then agent will send a notification to the server to trigger a full backup.

In one example, the triggers may adjust based on actual values. For example, if the initial differential backup was performed at 23% and the interval value is 10%, the next differential backup may not occur until the MPC is 33%. Similarly, subsequent differential backups may be triggered based on the interval value and the actual MPC value associated with the last backup.

In response to the trigger from the agent, the server sends a workorder to perform the relevant type of backup.

Embodiments of the invention provide several advantages. First, unnecessary differential backups are avoided and the number of backups in the backup chain can be reduced. This makes it easier to perform maintenance for the databases. Also, it is advantageous to perform a full backup instead of a differential backup when the MPC is high due to the complexity or restoring from a differential backup that has a lot of changes. Next, the backup process can be fully automated and manual interventions are reduced.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for backing up a database with a backup server and an agent operating on a client machine, the method comprising:

setting parameters for the database by the server, the parameters including a minimum value, an interval value, and a maximum value;
performing a query, by the agent, to the database to determine a modified page count;
performing a differential backup when the modified page count is greater than the minimum value;
performing a full backup when the modified page count is greater than the maximum value; and
when a most recent backup is a different backup, performing a second differential backup when a current value of the modified page count is greater than a last differential modified page count plus the interval value, wherein the last differential modified page count is the modified page count at a time when the most recent backup was performed.

2. The method of claim 1, wherein the parameters are set for a plurality of databases.

3. The method of claim 1, wherein the query is a native query associated with the database.

4. The method of claim 1, further comprising performing the query at regular intervals to determine the current value of the modified page count.

5. The method of claim 1, further comprising resetting the modified page count after performing the full backup.

6. The method of claim 1, further comprising receiving the parameters from the backup server.

7. The method of claim 2, further comprising setting different parameters for at least some of the plurality of databases.

8. The method of claim 7, further comprising performing a differential backup or a full backup at each of the plurality of databases based on corresponding parameters.

9. The method of claim 1, wherein the minimum value, the interval value, and the maximum value correspond to threshold modified page counts and ensure that the full backup is performed each time the current value of the modified page count determined from a new query exceeds the maximum value.

10. The method of claim 1, further comprising, when a most recent backup is a differential backup, performing a differential backup when the current value of the modified page count determined from a new query is greater than the last differential modified page count plus the interval value.

11. A non-transitory computer readable medium comprising instructions for executing a method for backing up a database with a backup server and an agent operating on a client machine, the method comprising:

setting parameters for the database by the server, the parameters including a minimum value, an interval value, and a maximum value;
performing a query, by the agent, to the database to determine a modified page count;
performing a differential backup when the modified page count is greater than the minimum value;
performing a full backup when the modified page count is greater than the maximum value; and
when a most recent backup is a differential backup, performing a second differential backup when a current value of the modified page count is greater than a last differential modified page count plus the interval value, wherein the last differential modified page count is the modified page count at a time when the most recent backup was performed.

12. The non-transitory computer readable medium of claim 11, wherein the parameters are set for a plurality of databases.

13. The non-transitory computer readable medium of claim 11, wherein the query is a native query associated with the database.

14. The non-transitory computer readable medium of claim 11, further comprising performing the query at regular intervals to determine the current value of the modified page count.

15. The non-transitory computer readable medium of claim 11, further comprising resetting the modified page count after performing the full backup.

16. The non-transitory computer readable medium of claim 11, further comprising receiving the parameters from the backup server.

17. The non-transitory computer readable medium of claim 12, further comprising setting different parameters for at least some of the plurality of databases.

18. The non-transitory computer readable medium of claim 11, further comprising performing a differential backup or a full backup at each of the plurality of databases based on corresponding parameters.

19. The non-transitory computer readable medium of claim 11, wherein the minimum value, the interval value, and the maximum value correspond to threshold modified page counts and ensure that the full backup is performed each time the current value of the modified page count determined from a new query exceeds the maximum value.

20. The non-transitory computer readable medium of claim 11, further comprising, when a most recent backup is a differential backup, performing a differential backup when the current value of the modified page count determined from a new query is greater than the last differential modified page count plus the interval value.

* * * * *